Patented Mar. 16, 1954

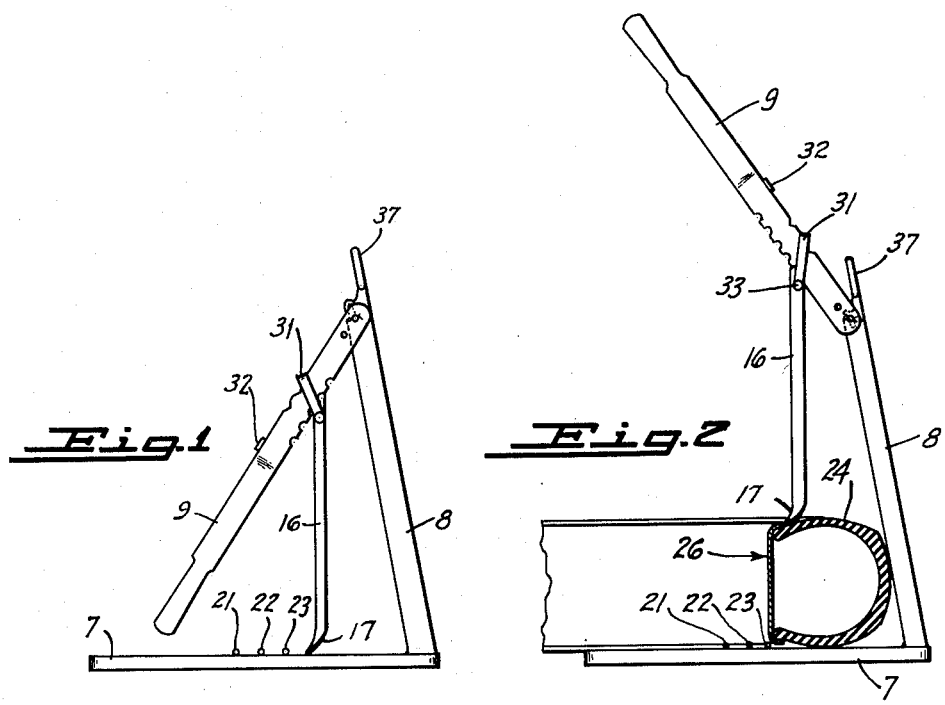
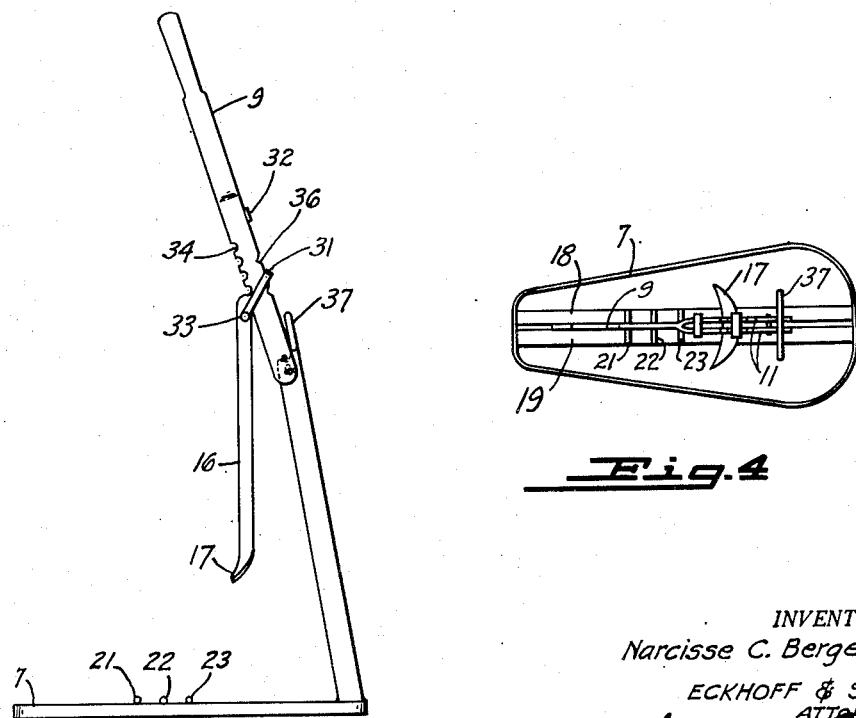

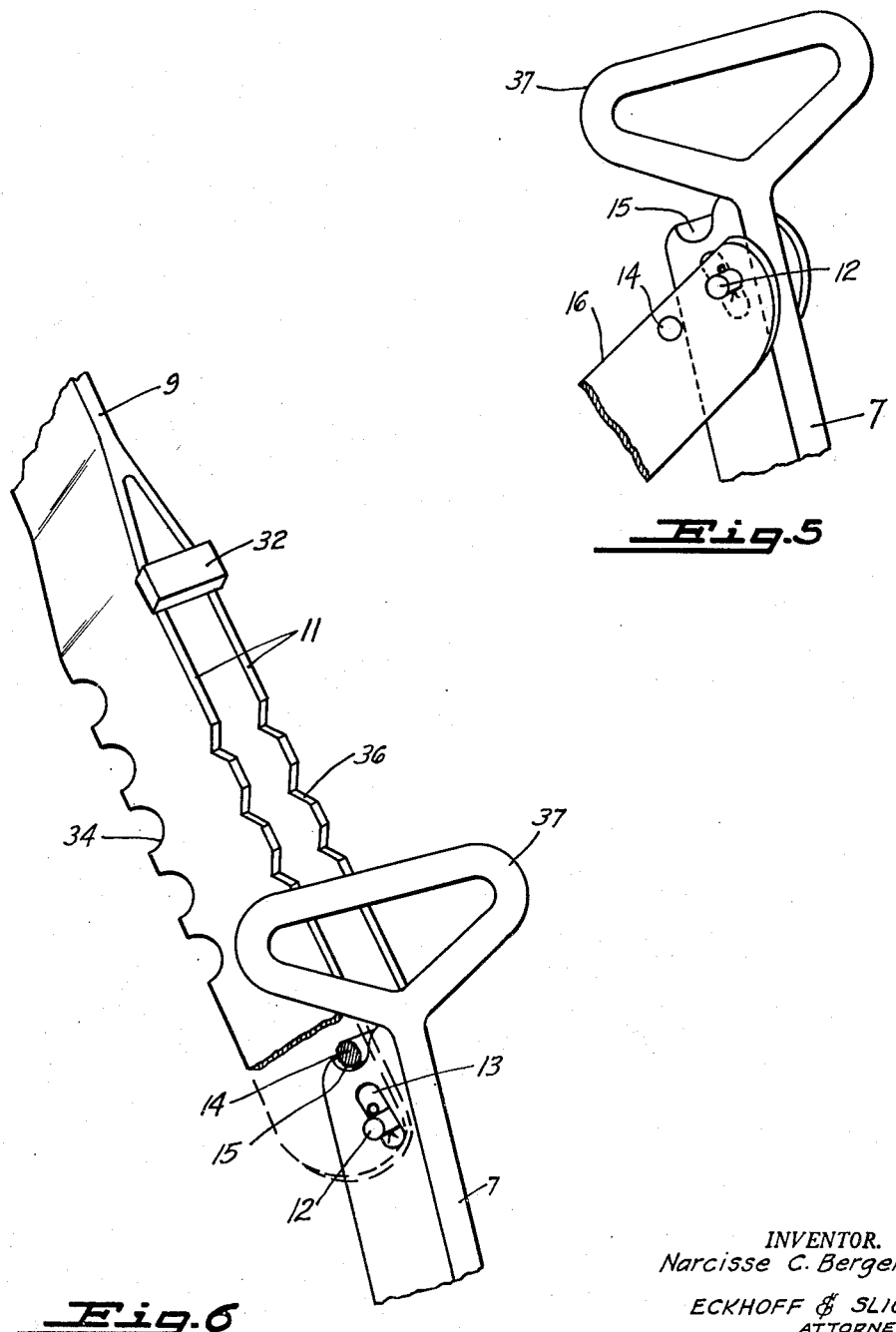

2,672,185

UNITED STATES PATENT OFFICE 2,672,185

LEVER ACTUATED TIRE CHANGING DEVICE

Narcisse Camlong Bergeron, Berkeley, Calif., assignor to Cam Tool Co. Inc., a corporation of California Application February 2, 1953, Serial No. 334,517

1 Claim. (Cl. 157—1.26)

This invention relates to a construction of a tool for removing a tire from a rim and particularly to one adapted to assist in releasing the bead of a tire from engagement with a wheel rim.

It is in general a broad object of the present invention to provide a lever actuated tire bead forcing device which can be utilized with various sizes of tires.

A further object of the present invention is to provide a tire tool in which the parts are so designed that they may be readily moved to and from a position of rest to engage a tire bead without requiring the operator to manipulate catches or other fastening devices and with a minimum of movement of the manipulated parts.

The invention includes other objects and features of advantage, some of which, together with the foregoing, will appear in the following description of the preferred form of the invention which is illustrated in the drawing accompanying and forming a part of the specification. Referring to the drawing, Figure 1 is a side view of the device showing the device in one at rest position.

Figure 2 is a view similar to Figure 1, showing the device in use.

Figure 3 is a side view showing the device in another at rest position.

Figure 4 is a plan view of the device shown in Figure 1.

Figure 5 is a perspective view showing details of the mounting of the handle upon the supporting standard.

Figure 6 is a fragmentary perspective view showing in large detail a portion of the handle and standard when the handle is at rest upon the end of the standard.

Referring to the drawing, the device includes a base or standard 7 made in arcuate form from a piece of strap metal of such size as to provide adequate stability for the device during its manipulation. At one end of the base 7 a standard 8 is provided, the standard extending upward at an angle to the vertical so that the standard extends forwardly along the run of the base. A lever 9 is mounted upon the standard for a hinged movement; the lever 9 is bifurcated as at 11, and a first pin 12 is extended between the bifurcated end of the lever and through an elongated slot 13 provided in the upper end of the standard at an acute angle to the longitudinal axis of the standard to permit lever 9 to move axially of the standard and to rotate upon the standard. A second pin 14 is provided in the bifurcated end of the handle 9 and spaced from the first pin to rest in the notched end 15 of the standard when lever 9 is rotated into a position wherein, in effect, it provides an extension of standard 8. Upon such rotation and axial movement, the handle can be moved from a position in which it can be freely manipulated, as in Figures 1 and 2, into a position of rest, as shown in Figures 3 and 6 and wherein the handle provides, in effect, an extension of the standard.

Mounted on the bifurcated end 11 of lever 9 is a depending arm 16 having an arcuate bead engaging member 17 of a form well-known in the art and adapted to engage a tire bead, as will be presently described. In accordance with this invention, depending arm 16 is supported upon the lever 9 by a U-shaped member 31 which is slidable along the bifurcated portion of the lever between the pin 14 and a stop 32 on the handle. Depending arm 16 is supported in the ends of the U-shaped member 31 by a large pin 33. The underside of the lever 9 is provided with a series of semi-circular recesses 34 in which pin 33 is received when the lever is forced down and against a tire bead, while the upper side of the lever 9 is provided with a series of spaced V-shaped notches 36, in which the U-shaped member rests when it depends with the handle in raised position on the standard, as in Figure 3.

The standard 7 includes two spaced members 18 and 19 extending from one end of the base to the other. In accordance with this invention, transverse rim engaging members 21, 22 and 23 are mounted at spaced distances from standard 8, each distance corresponding to the overall dimension from the inside of a rim to the outside of a given size of tire.

In use, a tire, indicated at 24 and mounted upon a rim generally indicated at 26, is placed on the base 7 with the tire in abutment against the standard 8, as is shown in Figure 2. In this position, the rim 26 engages one of the transverse members 21, 22 or 23, depending upon the overall dimension of the tire and rim, such engagement retaining the tire and rim with adequate security. The U-shaped member 31 is moved along the lever into a position wherein, with arm 16 hanging vertically, pin 33 will engage one of the semi-circular recesses 34 when the bead engaging member 17 is engaged with a tire bead. This positions the arm at the shortest distance from the fulcrum to apply a vertical force to the tire bead. Pressure is then applied to the bead to break the engagement of the bead with the rim. Because of the adjustment provided by engaging pin 33 with a selected one of the recesses 34, lever 16 can be provided to hang vertically for any given size of tire. This ensures application of the desired pressure by the arcuate member 17 on the tire bead for any size of tire.

When it is desired to position lever 9 out of the way so that a tire may be moved about or positioned on base 7, lever 9 is first raised into a position in which it provides an axial continuation of standard 8; the lever is then moved downwardly until pin 14 rests in the notched end 15 of the standard. In this position, the lever can be readily moved into operating position with a minimum of effort while the bead engaging member 17 is positioned for quick and ready engagement with the bead. Standard 8 is provided with a loop handle 37, which enables the device to be moved around readily; the handle also acts as a barrier to prevent lever 9 from swinging over the other side of standard 8.

From the foregoing, I believe it will be apparent that I have provided a relatively novel, simple and improved lever actuated tire bead forcing device which can be manipulated readily, is conveniently positioned, and is adaptable for use with various sizes of tires.

I claim:

A tire tool comprising a base; a standard extending upwardly and forwardly from said base having a slot adjacent the upper end of the standard and a notch in said upper end; a lever having a bifurcated end, a first pin mounted in said slot in the standard and in said bifurcated end, and a second pin mounted in said bifurcated end for engagement with the notched end of the standard to enable the lever to be held in an inactive position wherein it extends substantially in axial alignment with the standard; an arm depending from said lever intermediate the ends thereof and adjacent to said pin; a tire bead engaging element mounted upon the end of said depending arm; a U-member mounting the arm slidably along the lever; a pin securing the ends of the U-member and arm together; the underside of said lever having several recesses therein for engagement by said pin; the upper side of the lever having a plurality of notches for engaging the U-member, a stop member on the lever to limit the sliding movement of the U-member, and a plurality of rim-engaging members each mounted on said base parallel to one another and to said element and in a different spaced relation to said standard to engage and retain temporarily a rim on a tire positioned for manipulation by said tire bead engaging element.

NARCISSE CAMLONG BERGERON.

References Cited in the file of this patent

UNITED STATES PATENTS

| Number | Name | Date |
| --- | --- | --- |
| 1,208,184 | Mayer | Dec. 12, 1916 |
| 2,433,113 | Graves et al. | Dec. 23, 1947 |
| 2,523,979 | Weeks, et al. | Sept. 26, 1950 |
| 2,598,793 | Helton | June 3, 1952 |